United States Patent [19]

Motley et al.

[11] Patent Number: 5,682,256
[45] Date of Patent: Oct. 28, 1997

[54] COMMUNICATIONS SYSTEM

[75] Inventors: Andrew James Motley, Woodbridge; Anthony Gerard Chadney, Ipswich, both of England

[73] Assignee: British Telecommunications Public Limited Company, London, England

[21] Appl. No.: 607,199

[22] Filed: Feb. 26, 1996

Related U.S. Application Data

[63] Continuation of Ser. No. 271,259, Jul. 7, 1994, abandoned, which is a continuation of Ser. No. 689,923, filed as PCT/GB89/01341, Nov. 10, 1989, abandoned.

[30] Foreign Application Priority Data

Nov. 11, 1988 [GB] United Kingdom ............. 8826476

[51] Int. Cl.$^6$ .................. H04J 14/00; H04B 10/00
[52] U.S. Cl. ........... 359/117; 359/145; 359/172; 455/33.4; 455/54.1; 455/56.1
[58] Field of Search ............... 359/117, 118, 359/135, 136, 145, 151, 167, 172, 152; 455/16, 53.1, 54.1, 56.1, 11.1, 33.1, 33.4; 379/56, 59

[56] References Cited

U.S. PATENT DOCUMENTS

| | | | |
|---|---|---|---|
| 4,222,115 | 9/1980 | Cooper et al. | 375/1 |
| 4,308,429 | 12/1981 | Kai et al. | 455/33.4 |
| 4,456,793 | 6/1984 | Baker et al. | 359/152 |
| 4,468,765 | 8/1984 | Hensel et al. | 359/117 |
| 4,535,441 | 8/1985 | Schwaertzel et al. | 445/33.4 |
| 4,670,899 | 6/1987 | Brody et al. | 455/33.4 |
| 4,686,671 | 8/1987 | Burian et al. | 455/56 |
| 4,807,222 | 2/1989 | Amitay | 359/172 |
| 4,817,204 | 3/1989 | Jannelli et al. | 359/152 |
| 4,829,512 | 5/1989 | Nakai et al. | 359/117 |

(List continued on next page.)

FOREIGN PATENT DOCUMENTS

| | | | |
|---|---|---|---|
| 0156336 | 3/1985 | European Pat. Off. | |
| 0156336 | 10/1985 | European Pat. Off. | H04Q 7/04 |
| 0233963 | 9/1987 | European Pat. Off. | |
| 8610195 | 9/1987 | European Pat. Off. | H04B 7/26 |
| 0391597 A3 | 10/1990 | European Pat. Off. | H04Q 7/04 |
| 0471487 A1 | 8/1991 | European Pat. Off. | H03L 7/185 |
| 0468688 A3 | 9/1992 | European Pat. Off. | H04B 7/26 |
| 3135231 | 4/1983 | Germany | H04Q 7/04 |
| 3220817A1 | 12/1993 | Germany | H04B 9/00 |
| 55-143854 | 11/1980 | Japan | H04B 7/00 |
| 55-14385 | 1/1981 | Japan | H04B 9/00 |
| 2138652 | 10/1984 | United Kingdom | |
| 8311091 | 10/1984 | United Kingdom | H04Q 11/02 |
| 2214755 | 9/1989 | United Kingdom | H04B 5/00 |

OTHER PUBLICATIONS

*Proceedings of the IEEE*, vol. 75, No. 4, Apr. 1987, IEEE, (New York, US), D.C. Cox: "Universal Digital Portable Radio Communications," pp. 436–477.

*Patent Abstracts of Japan*, vol. 5, No. 15 (E–43)(687), 27 Jan. 1981 & JP A 55143854 (Nippon Denshind Denwa Kosha) 10 Nov. 1980.

(List continued on next page.)

Primary Examiner—Melvin Marcelo
Assistant Examiner—Rafael Bacares
Attorney, Agent, or Firm—Nixon & Vanderhye, P.C.

[57] ABSTRACT

A communications system has a base center with radio transceivers for providing a number of radio frequency (RF) communications links and a plurality of fixed radio ports through which RF signals can be transmitted and received over the air. A fiber optic network interconnects the RF transceivers and the fixed radio ports and carries the RF signals by means of optical signals. There is a plurality of radio/optical interfaces by which RF signals can be modulated onto and demodulated from one or more optical signals, between the RF transceivers and the fiber optic network, and between the fiber optic network and the fixed radio ports. A matrix switch selectively interconnects the transceivers and the radio ports through the fiber optic network.

20 Claims, 5 Drawing Sheets

U.S. PATENT DOCUMENTS

| | | | |
|---|---|---|---|
| 4,829,544 | 5/1989 | Barnes et al. | 455/56 |
| 4,890,315 | 12/1989 | Bendixen et al. | 379/59 |
| 4,916,460 | 4/1990 | Powell | 359/152 |
| 5,001,757 | 3/1991 | Field et al. | 381/13 |
| 5,067,173 | 11/1991 | Gordon et al. | 359/127 |
| 5,109,532 | 4/1992 | Petrovic et al. | 455/63 |
| 5,199,062 | 3/1993 | Von Meister et al. | 379/67 |

OTHER PUBLICATIONS

Way et al, "90-Channel FM Video Transmission to 2048 Terminals Using Two Inline Traveling-Wave Laser Amplifiers in a 1300 nm Subcarrier Multiplexed Optical System", pp. 37-39.

Fye, "Design of Fiber Optic Antenna Remoting Links for Cellular Radio Application", IEEE 1990, pp. 622-625.

Symposium Record CATV Session, Jun. 1985 note fig. 3.

Leaflet: Walmore Fibrecom, distributed by Walmore Electronics Limited, Laser House, 132-140 Goswell Road, London, England.

"Don't Scrap Your Coax Yet, But See What A Strand Of Plastic Can Do", by David McKay, Decibel Products, *Communications*.

David McKay, Moving RF Over Fiber Optics, Oct. 1988, all.

Gerd Keiser, Optical Fiber Communication, 1983, p. 8.

Donald C. Cox, Universal Digital Portable Radio Communications, Apr. 1987, p. 436-477.

Fig.2a.

\* DENOTES CONNECTION OF A COLUMN TO A ROW THUS COLUMN M IS SHOWN CONNECTED TO ROWS 1, N-1 AND N

COMMUNICATIONS SYSTEM

This is a continuation of application Ser. No. 08/271,259, filed Jul. 7, 1994, now abandoned, which in turn is a continuation of application Ser. No. 07/689,923, filed as PCT/GB89/01341 Nov. 10, 1989, now abandoned.

BACKGROUND OF THE INVENTION

1. Field of the Invention

The present invention relates to a communications system, and in particular to a system for interconnecting mobile radio (RF) units to a fixed network or system e.g. PSM, ISDN, LAN or PBX.

2. Description of Related Art

At present, for example, in a cellular radio system mobile radio (RF) units communicate with fixed base stations which have radio transceivers that are connected to a switching control centre which is in turn coupled to the PSTN. In the proposed Telepoint system, cordless telephones (CTs) will be able to access the PSTN via radio communication with fixed base stations equiped with radio transceivers which are directly connected to the PSTN. In both these examples radio transceivers and base stations proliferate in the connection between the mobile user and the PSTN, or other network. These systems are therefore complicated and expensive. Future systems will want to provide improved coverage including the provision of many small radio "cells", and hence many base stations and radio transceivers will be required.

Difficulties in finding appropriate base station sites and the costs of equipping them may make such conventional developments impracticable; certainly they reduce the commercial attractiveness of such projects. The present invention seeks to provide a communication system of simplified structure and improved performance.

SUMMARY OF THE INVENTION

According to a first aspect the invention provides a communications system comprising: a base centre having one or more radio transceivers for providing a number of radio frequency (RF) communications links; a plurality of fixed radio ports through which RF signals can be transmitted and received over the air; a fibre optic network for interconnecting the RF transceivers and the fixed radio ports, and for carrying the RF signals by means of optical signals; a plurality of radio/optical interfaces by which RF signals can be modulated onto and demodulated from one or more optical signals, which interfaces are between the RF transceivers and the fibre optic network, and between the fibre optic network and the fixed radio ports.

The present invention also provides a communications system comprising: a base centre having one or more radio transceivers for providing a number of radio frequency (RF) communications links; a plurality of fixed radio ports through which RF signals can be transmitted and received over the air; a fibre optic network for interconnecting the RF transceivers and the fixed radio ports, and for carrying the RF signals by means of optical signals; a plurality of radio/optical interfaces by which RF signals can be modulated onto and demodulated from one or more optical signals, which interfaces are between the RF transceivers and the fibre optic network, and between the fibre optic network and the fixed radio ports; and a matrix switch for selectively interconnecting the transceivers and the radio ports through the fibre optic network.

The present invention allows for centralisation of transceivers into base centres, and the consequent advantages in terms of technical and commercial gain, by having the transceivers selectively connectable through the fibre optic network to the RF ports.

The RF Communication linking may for example, be time division multiplexed (TDM) or frequency division multiplexed (FDM).

BRIEF DESCRIPTION OF THE DRAWINGS

A preferred embodiment of the invention will now be described by way of example and with reference to the accompanying drawings, wherein.

DESCRIPTION OF THE PREFERRED EMBODIMENTS

Figure 1:
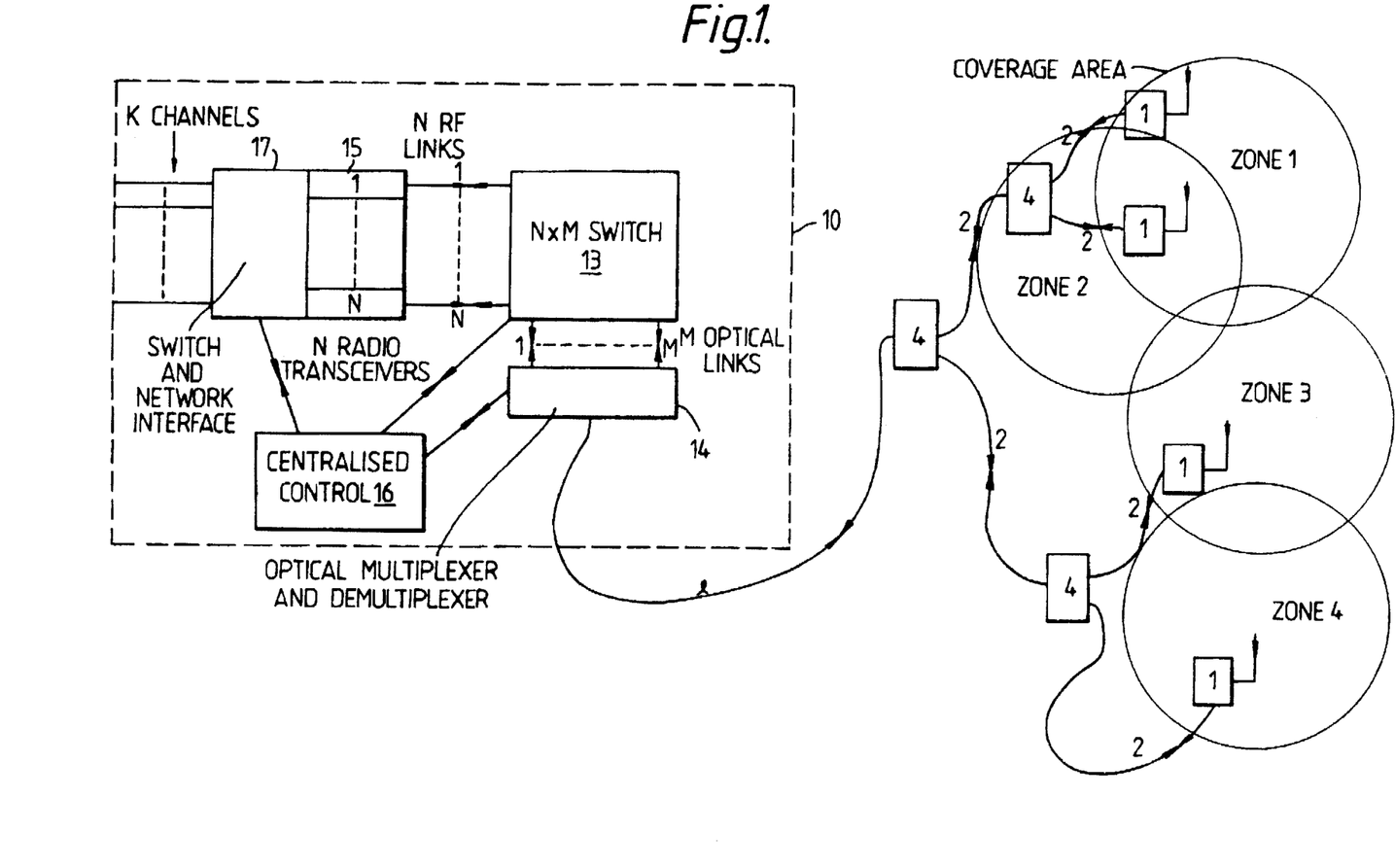
FIG. 1 is a schematic block diagram of a communications system according to a preferred embodiment of the invention.

The preferred embodiment illustrated in FIG. 1 is a multi-user, area coverage radio distribution system using an optical network 2.4 to link the fixed radio distribution ports 1 to a centralised radio and other signal processing base centre 10. An important feature of the system is the use of an optical carrier modulated, e.g. amplitude modulated, with a radio frequency (RF) signal.

In both the base centre 10 and RF ports 1 there are, arranged in different ways, radio/optical interfaces which can place an RF signal onto an optical carrier or conversely recover an RF signal from an optical carrier. The modulation of the optical carrier may be achieved by driving a suitable laser device with the input RF signal so that output of the laser is effectively intensity or amplitude modulated by the RF signal. With this method, a suitable optical detector receiving the amplitude modulated optical signal can produce a direct RF output. In the present specification, the term radio/optical interface is used in this context.

The radio ports 1 each have a radio/optical interface which receives and transmits radio carriers from and to roaming radio equipment. The radio carriers to be sent/received from the centralised location are placed onto/taken off an optical carrier, e.g. as described above. The optical network 2.4 linking the radio ports 1 to the base centre 10 is generally conventional, having optical links carrying RF carrier/carriers on optical carrier/carriers. Each optical link is shown as bidirectional. However, separate links could be provided for each direction. Within the optical system are optical multiplexers/demultiplexers (M+D) 4. Each multiplexer concentrates a number of optical carriers, say X, onto a fewer number of optical links than X. The demultiplexer-splits a number of optical carriers onto individual optical links.

At the base centre 10 the optical system 2.4 is connected to an optical multiplexer and demultiplexer (M+D) 14. The M+D 14 is connected (illustratively) by M optical lines to an N×M matrix switch 13, which will be described below in more detail. The N×M matrix switch 13 has N RF links to a number (N) radio transceivers 15. The radio transceivers 15 are connected through a switch 17 to a number (K) channels of another network which may be ISDN, cellular, LAN, PBX etc. K may be greater than or equal to N. Also in the base centre 10, a central unit 16 is connected to the switch 17, N×M matrix switch, and M+D 14 to control optical, RF, and baseband routing and switching, and co-ordinate the allocation of RF carriers and channels in conjunction with mobile equipment.

Figure 2A:
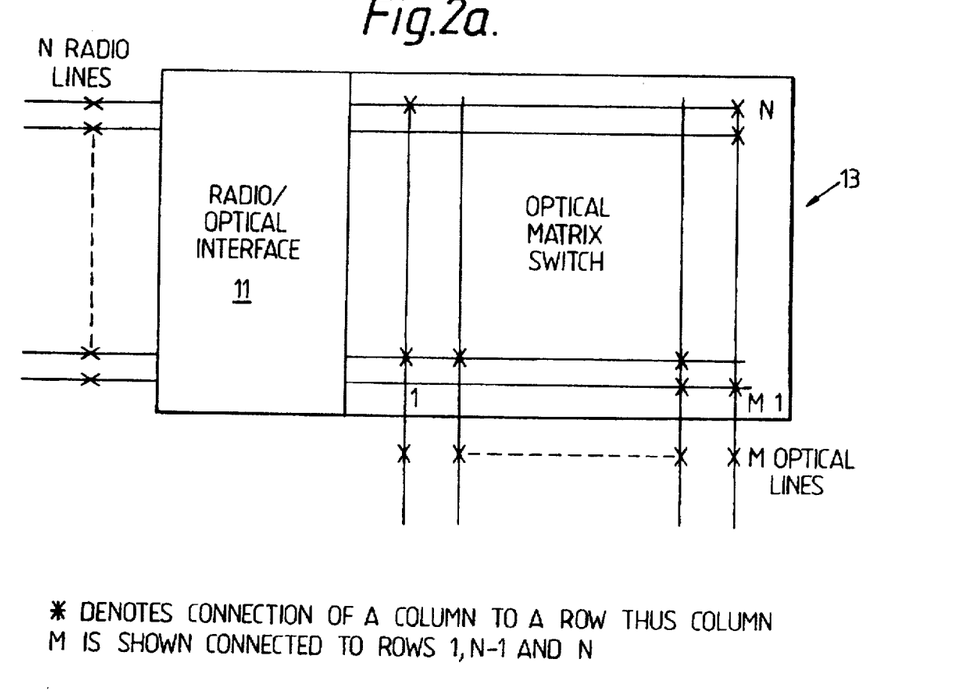
FIG. 2a is a schematic block diagram of an optical matrix switch which can form part of the preferred embodiment.
Figure 2B:
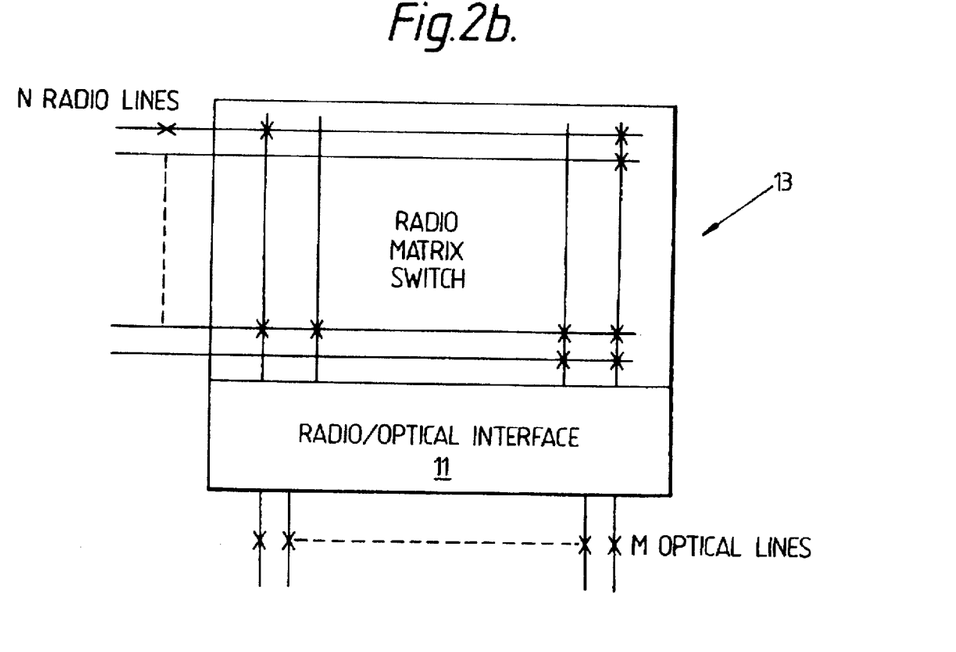
FIG. 2b is a schematic block diagram of an RF matrix switch which can form part of the preferred embodiment.

A central part of the base centre 10 is the N×M matrix switch 13. This multiplexes any of the N radio carriers onto any of the M optical transmission lines, i.e. none, one or more of the radio carriers may be on any one of the optical carriers at any one time. The N×M matrix switch 13 may be configured in one of two ways, as shown in FIGS. 2a and 2b. In each case, the radio/optical interface places the RF carriers to be transmitted from the central transceivers onto the optical carrier(s) and takes off, from the optical carrier (s), the RF carriers to be received by the central transceivers. The switching may be optical (FIG. 2a), in which case the radio/optical interface is on the radio "side" of the switch, or the switch may be a radio (RF) matrix switch (FIG. 2b), in which case the radio optical interface is on the optical system "side" of the switch. In either case, the overall result is that the N radio lines can be multiplexed onto the M optical lines.

The advantages of the system of the preferred embodiment are profound. A user can access the external network through any of the radio ports 1 with a suitable RF transceiver, e.g. a cordless telephone (CT), and be connected to a free one of the N transceivers 15. Provided the RF capacity was available, all N transceivers could be employed in calls to/from a particular one of the radio ports 1, or as would be more likely, the usage of the transceivers would me distributed among the radio ports of the system. Here lies a key advantage of the system: the centralisation of the radio transceivers. In the present system the radio transceivers are centralised, allowing more economic use and facilitating maintenance etc. Other significant advantages include the possibility of handover between ports covering different zones or areas, by simply switching between optical carriers, i.e. by switching within the N×M matrix switch 13. Also the use of diversity can easily be achieved centrally through switching or combining lines to 2 or more ports, to improve performance of mobiles covered by those ports. Further, advantageous use of the RF system can be achieved because any of the carriers allocated to the service, rather than a given subset, can be dynamically assigned by the centralised base, to a given zone or cell. Thus an RF carrier may be allocated to both zone 1 and zone 4, but to different users. At another time, RF carrier may be assigned to just zone 3. The total number of users may remain more or less constant for the whole system, but user density within the system may vary. For example, all the users may shift from zone 1 down to zone 4, with all the central transceivers continually active. If transceivers were placed remotely in each of the zones, the same number of transceivers as that at a central location would be required in each of the zones to meet the peak traffic demand during the day, even though they could remain idle for much of the time. Four times the number of transceivers of the centralised configuration would then be required for the system of FIG. 1, hence the improved trunking performance of the centralised scheme, minimising the cost of providing transceivers, the quantity of equipment in the field and affording a potential reduction in maintenance and installation costs.

Handover requires a change of base transceiver as a mobile transits zones. This need no longer be necessary as the switch, block 3, simply switches the active transceiver for a given mobile from one zone to another as the mobile makes the transition. Thus handover break is reduced to a potentially very short optical or RF switch time compared to the much longer period required to switch between transceivers.

The spectrum efficiency of many radio distribution systems are increased if the RF transmissions within the system are synchronised. This is difficult if transceivers are spread over several locations, but more straightforward when they are centralised.

Figure 3:
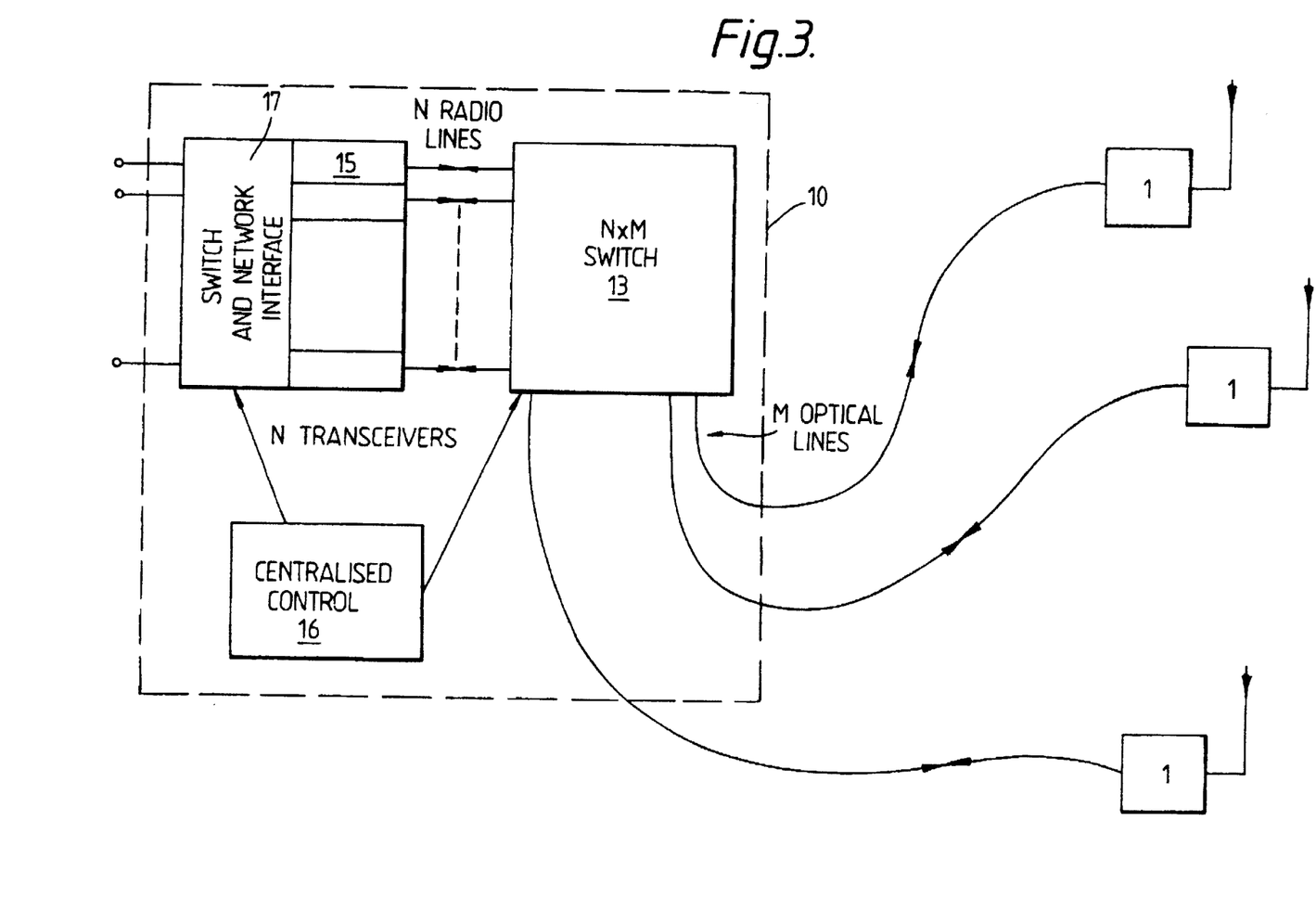
FIG. 3 is a schematic view of another embodiment of the invention.

An alternative embodiment the invention is shown in FIG. 3 and is very similar to that of FIG. 1, except that the optical system does not incorporate multiplexing/demultiplexing. Thus there are no M+Ds 4 and the M outputs of N×M switch 13 are connected directly to the radio ports 1. There is therefore a permanent 1 to 1 correspondence between the optical lines in the N×M switch 13 and the radio ports 1.

The embodiment of the invention described is based on the use of frequency division multiple access, where each communications link is on a separate radio frequency. As an alternative, time division multiple access could be used, where each communication link exists on separate time slots on a single radio channel. In this case there may still be multiple transceivers in the base centre 10 to cope with the traffic demand and hence provide frequency/timeslot reuse at the radio distribution ports 1. The connection from the transceivers 15 to the matrix switch 13 will then be by N radio links with P timeslots each, making N×P links in total to the matrix switch 13 from the transceivers 15. An extension of this approach is the possibility of a hybrid time and frequency division access system, with multiple radio carriers and several timeslots on each.

Figure 4:
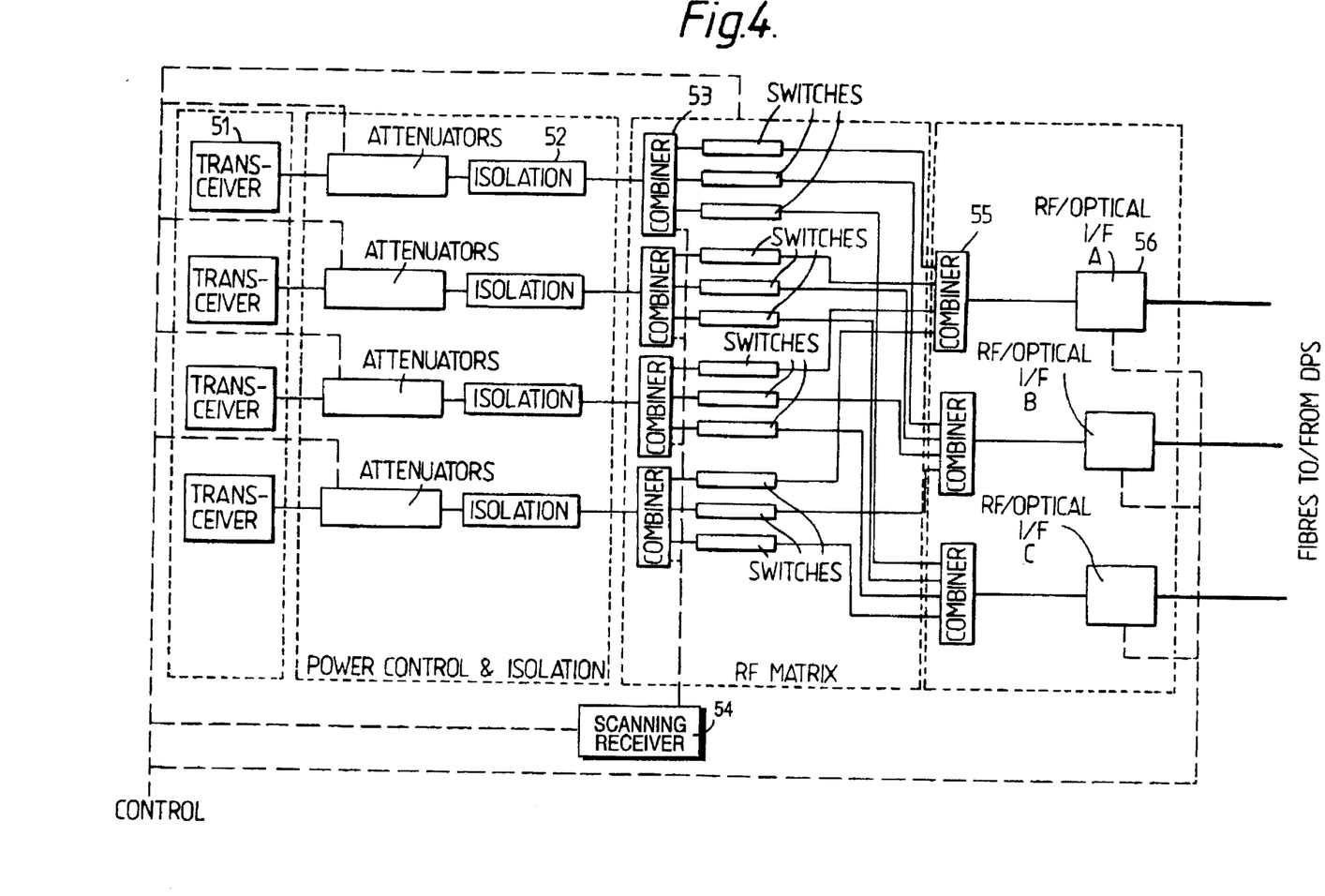
FIG. 4 is a schematic depiction of an RF switch.

An example of a form of an RF switch is shown in FIG. 4. The figure shows the RF matrix switch in a three distribution point system demonstrator. The RF matrix switch interconnects the four radio transceivers 51 (with their associated isolator circuits 52) to the three circuits each of which feeds a distribution point via a pair of fibres. Bi-directional RF connections for all the combinations of base unit and D.P. are made via switches that allow either through connection or isolation of the connection path. These switches are under computer control.

The signals from/to the radio transceiver 51 are split/combined in four 3 way combiners 53 (these are acutually 4 way combiners with the spare output feeding to the scanning receiver 54) with each output/input passing through a switch that can isolate that output/input. From the switches the signals go to the inputs of one of the three 4 way combiners 55 and hence to/from the D.P.s via one of the three RF/optical interfaces 56.

These switches are under microprocessor control and allow the RF matrix to switch any transceiver to any combination of the distribution points and conversely a distribution point to any combination of the transceivers. Thus a base unit can feed all the distribution points simultaneously then by changing the switches feed only one distribution point.

Two examples of the elements for 94 optical switch are shown in FIG. 5. There are two basic technologies; (i) Bulk Optic Devices and (ii) Guided Wave Devices.

Figure 5A:
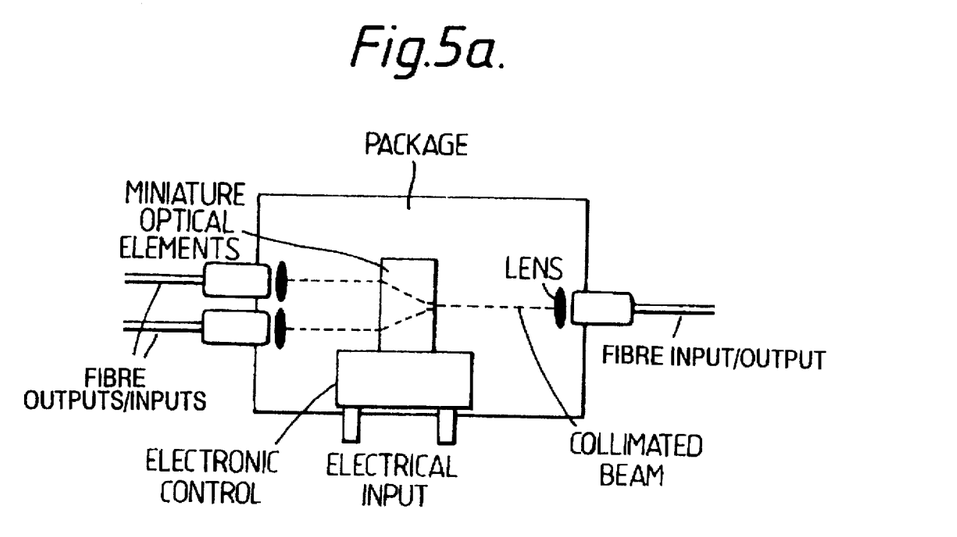
FIGS. 5(a) and 5(b) are schematic diagrams of possible optical switch elements.

A bulk optic switch element, shogun in FIG. 5(a), uses mechanical or physical reorientation of the optical path to achieve the switching of the incoming optical signals between output ports. An example of this type of switch is presented for a single input switchable between two outputs. Other switch configurations using this as a basic building block facilitate 2×2 and 2×4 switches.

Figure 5B:
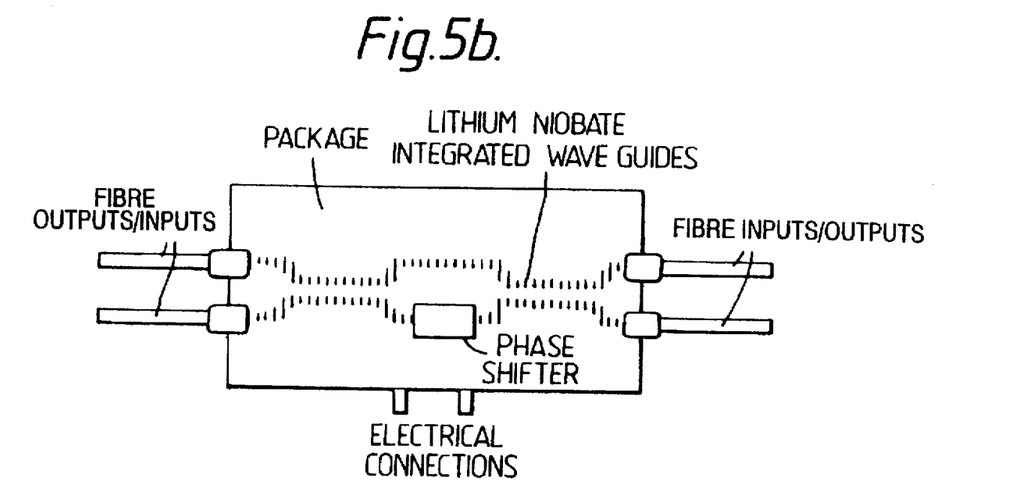

A guided wave device switch element, shown in FIG. 5(b), uses the electro-optic effect to change the optical propagation characteristics of switch waveguides through the application of electric fields. An example of this device type is the Mach Zender inteferometer (MZI) shown in FIG. 5(b). This type of switch-can be extended from a simple 2×2 to a non-blocking 8×8 switch matrix.

We claim:

1. A communications system comprising: a base centre having a plurality of independently operated radio frequency (RF) transceivers at the base centre for providing a plurality of radio frequency (RF) communications links; a plurality of fixed radio ports through which RF signals can be transmitted and received over the air; a fibre optic network for selectively interconnecting the RF transceivers and the fixed radio ports, and for carrying the RF signals by means of optical signals; a plurality of radio/optical interfaces by which RF signals can be modulated onto and demodulated from one or more optical signals, which interfaces are between the RF transceivers and the fibre optic network, and between the fibre optic network and the fixed radio ports.

2. A communications system comprising: a base centre having a plurality of independently operated radio frequency (RF) transceivers for providing a plurality of radio frequency (RF) communications links; a plurality of fixed radio ports through which RF signals can be transmitted and received over the air; a fibre optic network for selectively interconnecting the RF transceivers and the fixed radio ports, and for carrying the RF signals by means of optical signals; a plurality of radio/optical interfaces by which RF signals can be modulated onto and demodulated from one or more optical signals, which interfaces are between the RF transceivers and the fibre optic network, and between the fibre optic network and the fixed radio ports; and a matrix switch for selectively interconnecting the transceivers and the radio ports through the fibre optic network.

3. A communications system as claimed in claim 2 wherein the RF links are frequency division multiplexed.

4. A communications system as claimed in claim 2 wherein the RF links are time division multiplexed.

5. A communications system as claimed in claim 2, wherein there is means for combining RF signals to or from one or more of the RF ports.

6. A communications system comprising: a base centre having a plurality of radio transceivers for providing a number of radio frequency (RF) communications links; a plurality of fixed radio ports through which RF signals can be transmitted and received over the air; a fibre optic network for interconnecting the RF transceivers and the fixed radio ports, and for carrying the RF signals by means of optical signals; a plurality of radio/optical interfaces by which RF signals can be modulated onto and demodulated from one or more optical signals, which interfaces are between the RF transceivers and the fibre optic network, and between the fibre optic network and the fixed radio ports; and a matrix switch for selectively interconnecting the transceivers and the radio ports through the fibre optic network;

wherein the matrix switch is for switching optical signals and between the optical matrix switch and the plurality of RF transceivers there are one or more RF/optical interfaces.

7. A communications system as claimed in claim 2 wherein the matrix switch is for switching RF signals, and between the RF matrix switch and the fibre optic network there are one or more RF/optical interfaces.

8. A communications system as claimed in claim 1 wherein there is multiplexing/demultiplexing of the optical signals in the fibre optic network.

9. A communications system as claimed in claim 1 wherein the fibre optic network incorporates wavelength routing of optical signals.

10. A communication system as described in claim 1 which call handover is between radio ports is controlled in the base centre through switching the radio transceiver from one radio port to another radio port by a matrix switch.

11. A communication system as claimed in claim 10 in which diversity operation is provided by combining or switching between two or more radio points in the matrix switch.

12. A communication system as claimed in claim 1 in which dynamic channel allocation is controlled in the base centre.

13. A communications system comprising:

a base centre having a plurality of independently operated radio frequency (RF) transceivers at the base centre for establishing at least one radio frequency (RF) communication link;

a plurality of remotely located, fixedly situated, radio frequency (RF) communication ports for transceiving radio frequency (RF) signals via the air;

an optical fibre network selectively connecting said base centre with each of said remote RF communication ports;

an RF/optical signal interface at said base center connected between said optical fibre network and said radio frequency transceivers for converting RF-modulated optical signals to RF electrical signals and for converting RF electrical signals to RF-modulated optical signals; and an RF/optical signal interface at each of said RF communication ports connected to said optical fibre network for converting RF-modulated optical signals to RF electrical signals and for converting RF electrical signals to RF-modulated optical signals.

14. A cellular communications system for interfacing with plural portable or mobile RF transceivers via plural fixed RF communication ports, said system comprising:

a plurality of trunked RF communication channels including a plurality of independently operated RF transceivers accessible at a base centre location;

an optical fibre network selectively interconnecting said base centre location to said fixed RF communication ports; and an RF/optical signal interface at both said base centre and said fixed RF communication ports for converting RF electrical signals to RF-modulated optical signals and for converting RF-modulated optical signals to RF electrical signals so that communications between the base centre and the fixed RF communication ports is via RF-modulated optical signals, whereby RF transceiver resources may be concentrated and commonly located at the base centre for servicing a plurality of fixed RF communication ports.

15. A cellular communications system having trunked RF communication channels at a base station interfacing with plural portable or mobile RF transceivers via plural fixed RF communication ports distributed among overlapping cellular communication zones, said system comprising:

an optical fibre network selectively interconnecting said base station and its trunked RF communication channels with said fixed RF communication ports; and an RF/optical signal interface at each end of the fibre network for converting RF electrical signals to RF-modulated optical signals and vice versa.

16. A communications system as in claim 2 wherein there is multiplexing/demultiplexing of the optical signals in the fibre optic network.

17. A communications system as in claim 2 wherein the fibre optic network incorporates wavelength routing of optical signals.

18. A communication system as in claim 2 wherein call handover between radio ports is controlled in the base centre through switching the radio transceiver from one radio port to another radio port by the matrix switch.

19. A communication system as in claim 2 wherein diversity operation is provided by combining or switching between two or more radio points in the matrix switching.

20. A communication system as in claim 2 wherein dynamic channel allocation is controlled in the base centre.

* * * * *